Jan. 24, 1933.   V. A. SCHNEIDER   1,895,051
MEAT BLOCK CLEANER AND EVENER
Filed May 16, 1932
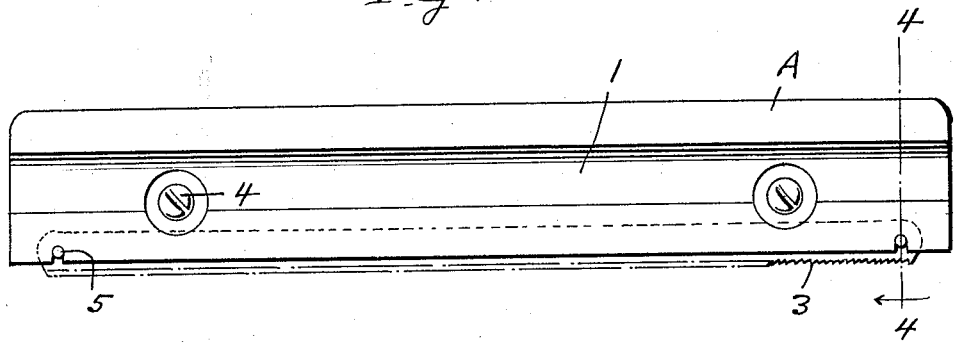
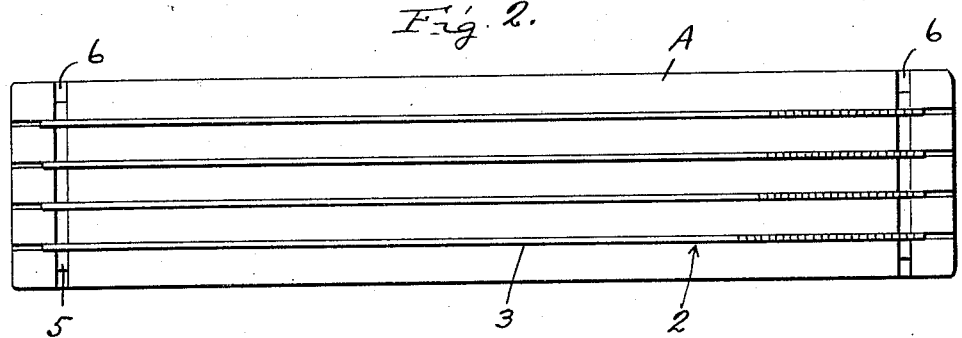
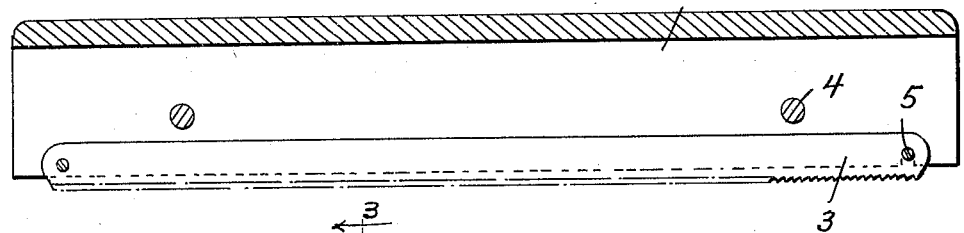
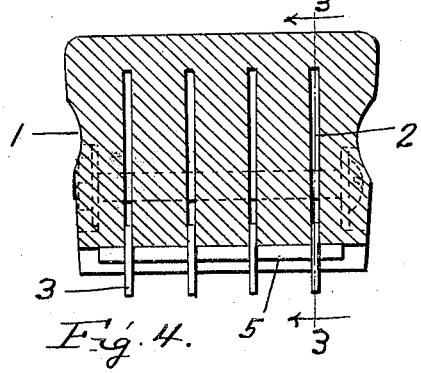
Inventor
Valentine A. Schneider
By *Clarence A. O'Brien*
Attorney Patented Jan. 24, 1933

1,895,051

UNITED STATES PATENT OFFICE

VALENTINE ADAM SCHNEIDER, OF ST. LOUIS, MISSOURI

MEAT BLOCK CLEANER AND EVENER

Application filed May 16, 1932. Serial No. 611,729.

This invention relates to a device for evening meat blocks and the like, the general object of the invention being to provide a scraper block having grooves therein for receiving hack saw blades with means for clamping the blades in the slots so that the blades can be easily removed and replaced with new ones whenever desired, with means whereby the scraper block can be held in a position when drawn over the meat block to quickly and easily even the surface of the same.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing, wherein like characters denote like or corresponding parts throughout the several views, and in which:—

Figure 1 is an elevation of the invention.

Fig. 2 is a bottom plan view.

Fig. 3 is a longitudinal sectional view, the section being taken on line 3—3 of Fig. 4.

Fig. 4 is a sectional view taken on line 4—4 of Fig. 1.

In these views, the scraper block is shown at A and is of elongated shape as shown and is provided with the grooves 1 in its sides which form finger grips, said sides tapering slightly from the top of the block to the bottom thereof. The block is provided with a plurality of vertically arranged slots 2 therein for receiving the hack saw blades 3 and screws or bolts 4 pass transversely through the block and when the nuts of these screws or bolts are tightened, the blades are clamped in the slots, as shown in Fig. 4 with the tooth portions projecting from the bottom thereof.

A pair of pins 5 pass through holes in the ends of the blades and these pins fit in grooves 6 formed in the bottom of the block. Both the heads of the bolts or screws and the nuts are countersunk as shown in Fig. 4.

The device is placed upon the meat block in a slightly angular position and then pulled towards the user with merely the weight of the hand upon it. No extra pressure is required. As the device passes across the surface of the meat block all the teeth of each blade are in a cutting position so that it will easily and quickly remove irregularities in the surface of the block and make the same smooth and even.

As the parts are held tightly together by the bolts, a whisk broom or the like can be used for removing the cuttings between the blades. The bolts or screws can be loosened by a screw driver or the like so as to remove the pressure against the blades, and then the blades can be removed and substituted by new ones whenever desired or required. As the blades are being placed in the slots, the blades are passed through the holes thereof after which the pins are equalized and then the blades are pressed firmly into the slots which will even all the blades into a uniform cutting position, after which the screws or bolts are tightened to clamp the blades in position.

It is thought from the foregoing description that the advantages and novel features of the invention will be readily apparent.

It is to be understood that changes may be made in the construction and in the combination and arrangement of the several features provided that such changes fall within the scope of the appended claims.

Having thus described my invention, what I claim as new is:—

1. A meat block cleaning device comprising an elongated block having parallel slots passing through the lower face, hack saw blades located in the slots, transversely arranged bolts passing thru the block for clamping the blades in the slots, pins passing through holes in the ends of the blades and the lower face of the block having grooves therein for receiving the pins, and said block having grooves in its sides forming finger holds.

2. A device of the class described comprising an elongated block having slots therein of considerable depth and extending from one end of the block to the other end, said slots opening out through the bottom of the block, toothed scraping blades, transversely arranged pins passing through the blades, for holding the blades together in a group, portions of the blades extending into the slots with their toothed portions depending from the block, and transversely arranged bolts passing through the block for clamping the blades in the slots.

In testimony whereof I affix my signature.

VALENTINE ADAM SCHNEIDER.